United States Patent Office 3,456,453
Patented July 22, 1969

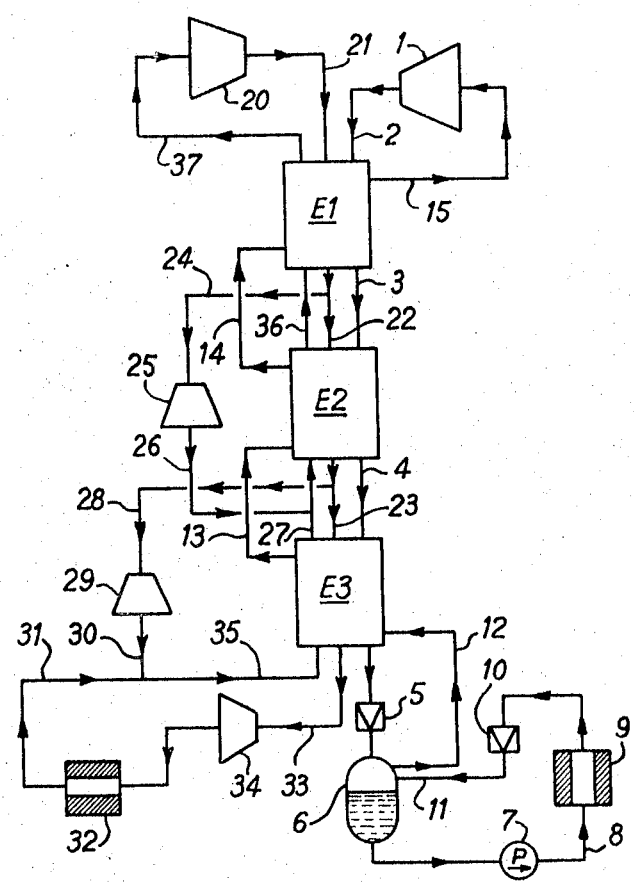

3,456,453
METHOD OF MAINTAINING ELECTRICAL APPARATUS AT VERY LOW TEMPERATURE
Emile Carbonell, Grenoble, France, assignor to L'Air Liquide, Societe Anonyme, pour l'Etude et l'Exploitation des Procedes Georges Claude
Filed Mar. 8, 1968, Ser. No. 711,799
Claims priority, application France, Mar. 31, 1967, 100,920
Int. Cl. F25b 7/00, 9/02; H01b 7/34
U.S. Cl. 62—79                                      6 Claims

ABSTRACT OF THE DISCLOSURE

A method of cooling cryotransformers (9) and cryoturboalternators (32), wherein the turboalternators are cooled by sub-cooled liquid hydrogen, and the cryotransformers by gaseous helium, and the hydrogen and the helium are compressed and cooled simultaneously to 21° K., in separate circuits, by heat exchange with part of the helium expanded in turbines (25, 29), and then the hydrogen is liquefied by valve expansion (5), and the helium is further cooled by expansion in another turbine (34).

---

The present invention relates to a method of maintaining the electric conductors of voltage transformers and of turboalternators at very low temperatures, below about 21° K., in which the electric conductors of the transformers are cooled by heat exchange with liquid hydrogen under a pressure slightly higher than atmospheric pressure and sufficiently subcooled for the heat exchange not to produce the boiling thereof, and those of the turboalternators by heat exchange with gaseous helium. This method is particularly applicable to maintaining at low temperature the electricity generating stations in which the electric conductors of the different units, particularly the turboalternators and the transformers, are cooled to very low temperature, so as to reduce to very small values the energy losses due to Joule effect.

It is in fact known that certain metals in very pure state, particularly aluminum, see their electrical resistivity reduced by a considerable proportion if they are brought to very low temperature. The release of heat by Joule effect must then be absorbed by heat exchange with cryogenic fluids. However, the energy consumption of a cold production cycle at low temperature, for a production of a constant cold input, increases rapidly when the level of the low temperature is lowered. It is understood that accordingly an optimum temperature level of the electric conductors exists, for which the energy consumption is minimal. In the case of very pure aluminum, this optimum level is in the region of 16°–17° K.

It is possible to obtain an absolutely fixed temperature level only by heat exchange with a boiling liquid. However, the temperature level of 16°–17° K. is below the boiling point under atmospheric pressure, 20.2° K., of liquid hydrogen, the only cryogenic liquid which can be used in this temperature range. Even if it is possible in theory to obtain a temperature of 16°–17° K. by boiling liquid hydrogen under vacuum, this cannot be undertaken industrially, because of the danger of explosion which would be caused by any re-entrance of air into a circuit containing hydrogen. Furthermore, neither gaseous hydrogen nor gaseous helium is a good dielectric, in contrast to liquid hydrogen.

It is thus necessary to ensure the maintenance of the cold state of the electric conductors of transformers, on the one hand, and of turboalternators, on the other hand, by means of different refrigerating fluids. The transformers, which are subject to high dielectric stresses, will be cooled by liquid hydrogen under a pressure slightly higher than atmospheric pressure, sufficiently subcooled for the exchange of heat not to produce the boiling thereof, and the turboalternators will be cooled by heat exchange with gaseous helium at a mean temperature of 16°–17– K.

The production of these refrigerating fluids at low temperature would lead to a complex method and installation if it were desired to produce them by different refrigeration cycles, since it would be necessary to provide several expansion machines at progressively lower temperature levels in the helium and hydrogen circuits, or even preliminary cooling operations by means of baths of liquid nitrogen and liquid hydrogen, followed by Joule-Thomson expansion valves.

The method according to the invention enables this disadvantage to be avoided and to ensure in a simple manner the simultaneous production of subcooled liquid hydrogen at a temperature close to 20° K. and also gaseous helium in the region of 15° K., with a relatively small energy consumption and without using auxiliary refrigerating fluids. It is characterised in that the hydrogen and the helium are compressed and cooled simultaneously to approximately 21° K., in separate circuits, by heat exchange with a part of the helium cooled by expansion with external work at low pressure, and then in that the hydrogen is partially liquefied by Joule-Thomson expansion in the region of atmospheric pressure, while the helium under pressure at about 21° K. is again cooled to a temperature of about 15° K. by expansion with external work at low pressure.

In addition, it preferably comprises the following methods of operation, separately or in combination;

(a) The liquefied hydrogen is brought to the subcooled state by a slight pressurizing by means of a pump;

(b) The liquid hydrogen reheated by heat exchange with the electric conductors is expanded in the region of atmospheric pressure, the subsisting liquid hydrogen being re-united with the liquefied hydrogen by the Joule-Thomson expansion, while the gaseous hydrogen is reheated and re-compressed with the gaseous hydrogen resulting from the Joule-Thomson expansion;

(c) The hydrogen is brought to a pressure of 25 to 40 bars absolute before it is cooled and liquefied;

(d) The helium is brought to a pressure of 15 to 20 bars absolute, before it is cooled, and its expansions with external work are effected down to the region of atmospheric pressure.

There will now be described, as a non-limitative example, an installation by which turboalternators and transformers are maintained at very low temperature by using the method of the invention. The installation is illustrated diagrammatically in the accompanying drawing. The hydrogen circuit and the helium circuit will hereinafter be successively described.

1. Hydrogen circuit

The hyrogen is brought to a pressure of 25 to 40 bars by the compressor 1. After cooling to ambient temperature in a water condenser (not shown), it passes successively through the pipes 2, 3 and 4 into the nests of tubes of the exchangers E₁, E₂ E₃, where it is cooled to approximately 21°–22° K. On leaving the last exchanger, it is expanded to the region of atmospheric pressure in a valve 5 and is partially liquefied in a separator 6. According to the invention, the liquid portion is brought by means of a pump 7 under a pressure slightly higher than the initial pressure and passes by way of the pipe 8 around the windings of transformers, shown diagrammatically at 9, without however being vaporized. It is once again brought by an expansion valve 10 to its initial pressure and returns via the pipe 11 to the separator 6. The portion of vaporized hydrogen leaves the separator by way of the pipe 12 and returns to the inlet of the compressor 1 by passing successively through the pipes 12, 13 and 14 into the exchangers $E_3$, $E_2$, $E_1$, and then through the pipe 15 to the compressor 1.

2. Helium circuit

The helium is brought to a pressure of 15 to 20 bars by the compressor 20. After cooling to ambient temperature in a water condenser (not shown), it passes successively through the pipes 21, 22 and 23 into the nests of tubes of the exchangers $E_1$, $E_2$, $E_3$, in heat exchange with expanded helium fractions, as will be indicated in greater detail below.

On leaving the first exchanger $E_1$, a regulatable part of the helium stream under pressure is diverted through the pipe 24 and is expanded with external work up to a pressure of about one bar absolute in a turbine 25. The expanded and cooled gas is re-combined via the pipe 26 with the helium stream at low-pressure reaching the cold end of the exchanger $E_2$ via the pipe 27.

In the same way, a second portion of the helium under pressure is diverted through the pipe 28 at the outlet end of the second exchanger $E_2$ and is expanded with external work in a second turbine 29 to a pressure of one bar.

The gas, thus expanded and cooled, is re-united via the pipe 30 with the helium stream at low pressure leaving the turboalternators shown diagrammatically at 32 by way of the pipe 31.

The helium under pressure leaves the exchanger $E_3$ at a temperature of about 21°–22° K. via the conduit 33.

It is expanded with external work in the third turbine 34 to the region of atmospheric pressure. Its temperature is then approximately 15° K. It is employed for the refrigeration of the turboalternators 32. Thus reheated to about 18° to 19° K., it is rejoined by the helium expanded in the turbine 29 and passes successively through the pipes 35, 27 and 36 into the exchangers $E_3$, $E_2$ and $E_1$, before returning via the pipe 37 to the intake of the compressor 20.

It will be understood that various modifications can be incorporated into the installation which has just been described, without departing from the scope of the invention. In particular, the number of turbines for expanding the helium can be increased, this ensuring a better thermodynamic efficiency at the expense of a complication of the installation.

The subcooling of the liquid hydrogen could possibly be obtained, not by pressuring by means of a pump, but by heat exchange with a part of the colder helium leaving the turboalternators 32, or possibly taken off from the outlet end of the turbine 34. The expansion with external work of the helium can be effected in reciprocating expanders instead of turbines, particularly if the rates of flow in the helium circuit are relatively small.

What I claim is:

1. A method of cooling electrical equipment below about 21° K. by heat exchange with liquid hydrogen and gaseous helium, comprising compressing and cooling helium and hydrogen to about 21° K. in separate circuits by heat exchange with a portion of helium cooled by expansion with external work to a low pressure, expanding with external work helium thus compressed and cooled and thereafter heat exchanging it with electrical equipment, partly liquefying hydrogen thus compressed and cooled by Joule-Thomson expansion to about atmospheric pressure, and subcooling thus liquefied hydrogen and heat exchanging it with electric equipment without boiling the liquid hydrogen.

2. A method as claimed in claim 1, in which said subcooling of the liquefied hydrogen is effected by pumping.

3. A method as claimed in claim 1, and expanding liquid hydrogen reheated by heat exchange with the electrical equipment to about atmospheric pressure, recombining liquid hydrogen subsisting after the latter expansion with the hydrogen liquefied by said Joule-Thomson expansion, and reheating and recompressing gaseous hydrogen produced by said latter expansion with the gaseous hydrogen resulting from said Joule-Thomson expansion.

4. A method as claimed in claim 1, wherein the hydrogen is compressed to about 25 to 40 bars absolute before it is cooled and liquefied.

5. A method as claimed in claim 1, wherein the helium is compressed to about 15 to 20 bars absolute, before it is cooled, and its expansion with external work are effected to about atmospheric pressure.

6. A method as claimed in claim 1, in which said electrical equipment cooled by said helium comprises an electrical conductor of a cryoturboalternator and said electrical equipment cooled by said hydrogen comprises an electrical conductor of a cryotransformer.

References Cited

UNITED STATES PATENTS 3,199,304   8/1965   Zeitz _____ 62—79
3,360,955   10/1968   Witter _____ 62—332

WILLIAM J. WYE, Primary Examiner

U.S. Cl. X.R.

62—175, 332; 174—15